Feb. 14, 1961     J. R. BARTHOLOMEW     2,971,393
DISENGAGEMENT PREVENTING MEANS FOR A TWO SPEED AXLE
Filed March 19, 1957     2 Sheets-Sheet 1

INVENTOR.
JOHN R. BARTHOLOMEW
BY
ATTORNEY

Feb. 14, 1961 J. R. BARTHOLOMEW 2,971,393
DISENGAGEMENT PREVENTING MEANS FOR A TWO SPEED AXLE
Filed March 19, 1957 2 Sheets-Sheet 2
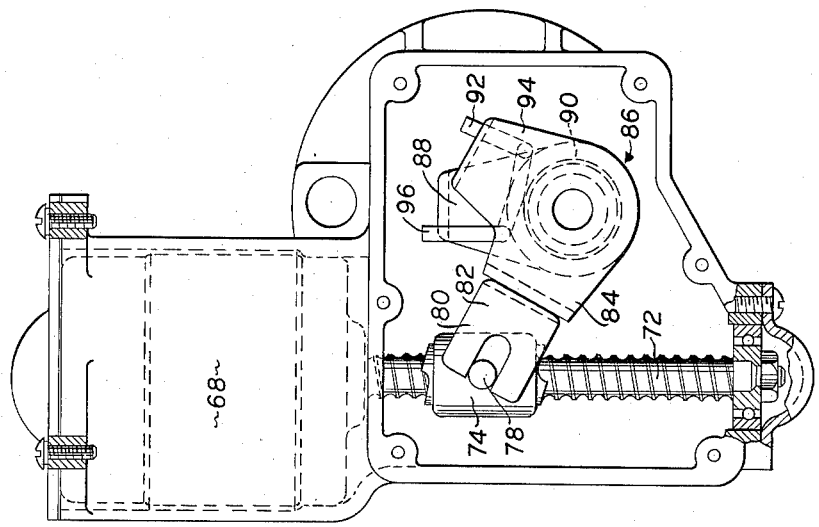
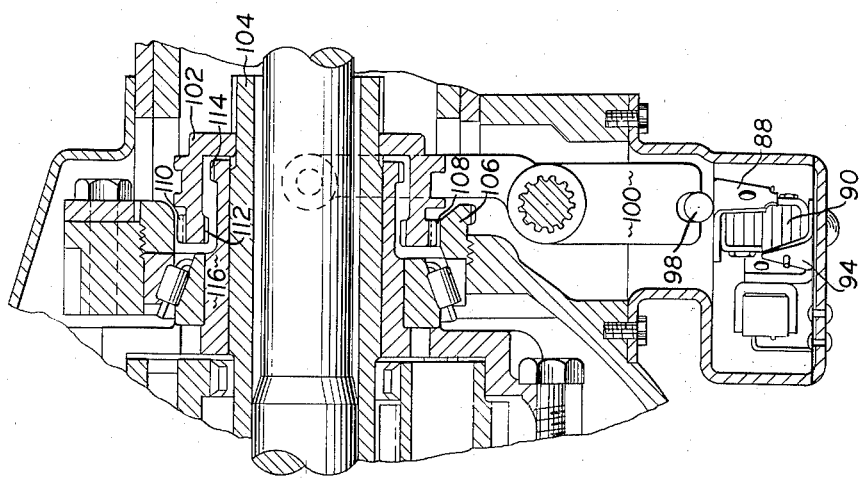
INVENTOR.
JOHN R. BARTHOLOMEW
BY
*Joseph R. Teagno*
ATTORNEY

United States Patent Office 2,971,393
Patented Feb. 14, 1961

2,971,393

DISENGAGEMENT PREVENTING MEANS FOR A TWO SPEED AXLE

John R. Bartholomew, Cleveland Heights, Ohio, assignor to Eaton Manufacturing Company, Cleveland, Ohio, a corporation of Ohio Filed Mar. 19, 1957, Ser. No. 647,079

3 Claims. (Cl. 74—336.5)

This invention relates to a multiple speed ratio vehicle axle and more specifically, to means operable to prevent an attempted shift from a high speed ratio to a lower speed ratio when the vehicle speed is above a predetermined rate. In two-speed axle devices of types heretofore known, no difficulty has been encountered in shifting from a low speed ratio to a high speed ratio. However, in shifting from high speed ratio to low speed ratio when it is desired to apply more torque to the driving wheels, it is necessary that the shift to a low speed ratio is not attempted when the vehicle is moving at too rapid a rate. If the shift is attempted under such conditions, it cannot be completed due to the excessive speed of rotation of the element drivingly connected to the vehicle wheels and it is necessary to wait for deceleration of the vehicle before the shift can be completed.

A further disadvantage is that if a shift from high speed ratio to low speed ratio is attempted when the vehicle is travelling above a predetermined rate of speed, the axle can be shifted to a neutral condition but the shift cannot be completed to the low speed ratio due to the high speed of the vehicle. If such a shift is attempted when the vehicle is travelling on a downgrade, it is impossible to shift back into the high speed ratio if the vehicle is allowed to go above a predetermined speed on the downgrade and consequently, engine braking cannot be utilized to retard the vehicle.

The instant invention overcomes these difficulties by providing a speed responsive means driven by the vehicle propeller shaft or any other means rotating proportional to vehicle speed. When electric motor means is utilized to change the speed ratios in the rear axle, the aforementioned speed responsive means is arranged to open a circuit above a predetermined vehicle speed so that current is interrupted between the source and the means to effect an axle shift from the high speed ratio to the low speed ratio. This arrangement has the effect of preventing an attempted shift to the low speed ratio when the vehicle speed is too high and further, to prevent disengagement from the high speed ratio to a neutral condition while the vehicle is travelling at an excessive rate.

It is an object of this invention to prevent shifting from high speed ratio to low speed ratio in a multiple speed ratio vehicle axle when the vehicle speed is above a predetermined rate.

A further object is to provide means to insure that the multiple speed ratio means will remain in a high speed ratio when the vehicle is travelling at a predetermined rate even though an attempt is made to shift to a lower speed ratio.

A still further object is to prevent an axle shift from a high speed ratio to a neutral condition when a vehicle is travelling above a predetermined rate.

These and other objects and advantages will become more apparent from the following detailed description of the device and from the accompanying drawings wherein:

Figure 3 is a sectional view of a portion of the axle shift control means and,

Figure 4 is a partial section showing another view of the shift control means.

Broadly, this invention is comprised of a multiple position axle selecting or preselecting switch having a source of current supplied thereto and which is movable to connect the current fed wire and a wire connected to a limit switch means which is in turn connected in series to a motor winding which when energized, effects an axle shift to a high speed ratio. When the selecting or preselecting switch is moved to the other position, the contacts are closed between the current fed wire and a wire connected in series with a speed responsive means, a limit switch means and a motor winding, which when energized, effects an axle shift to a low speed ratio. If the speed responsive means is driven above a predetermined speed by the vehicle, it will move to an open position, thus preventing energization of the motor winding to effect a shift to a low speed ratio.

Figure 1:
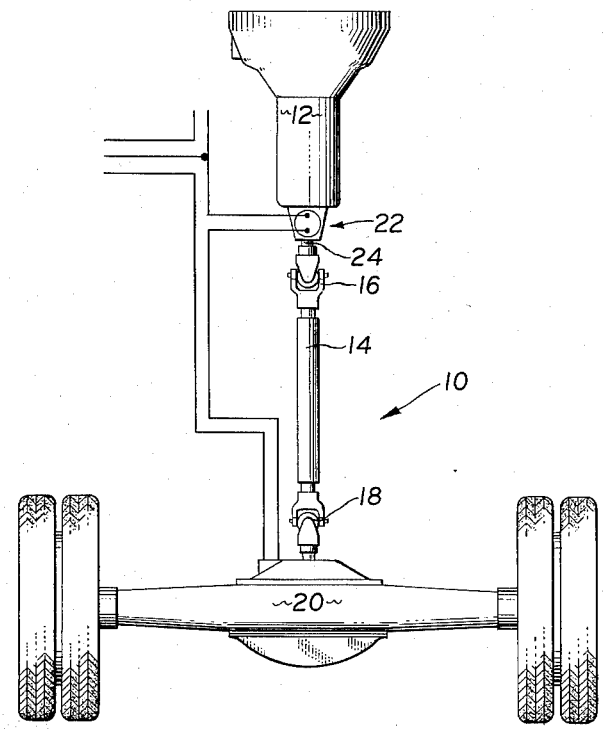
Figure 1 illustrates the instant invention as applied to a vehicle.

Referring to the drawing for a more detailed description of the device, Figure 1 illustrates a vehicle 10 having a transmission means 12 and a propeller shaft means 14 connected by universal joints 16 and 18 to a multiple speed ratio rear axle means 20. A speed responsive means 22 is adapted to be driven by output shaft 24 of transmission 12 but it is to be noted that the speed responsive means can be driven by any element rotating proportional to vehicle speed.

Figure 2:
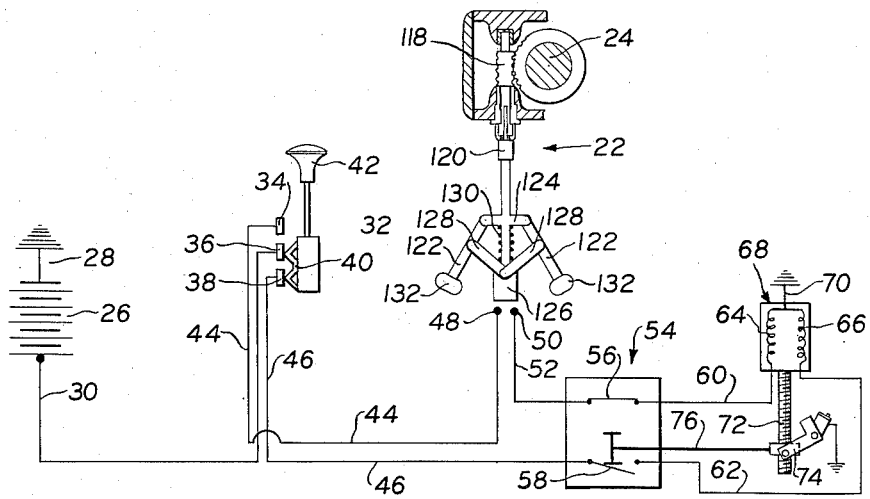
Figure 2 is a schematic illustration of the device.

Referring now to both Figures 1 and 2, a source of current 26 has a ground connection 28 and a conductor 30 connected thereto which is in turn connected to a terminal of a control switch 32. This switch is provided with spaced contacts 34, 36, 38, and a dual contact 40 adapted to be reciprocated by a handle means 42. A conductor 44 is connected to contact 34 and a conductor 46 is connected to contact 38. A pair of contacts 48 and 50 are connected respectively to conductor 44 and a conductor 52.

A limit switch assembly 54 is comprised of a pair of limit switches 56 and 58. Conductors 52 and 46 are connected to input terminals to limit switches 56 and 58, respectively. Conductors 60 and 62 are connected to output terminals of limit switches 56 and 58, respectively, and also respectively connected to motor windings 64 and 66 of an electric motor 68. Conductor 70 connects motor windings 64 and 66 to ground.

Referring to Figures 2 and 4, motor 68 is adapted to drive a threaded shaft 72 which has a nut 74 rotatably threaded thereon and is adapted to be moved longitudinally when threaded shaft 72 is rotated. The longitudinal direction of movement of nut 74 is determined by the direction of rotation of shaft 72 which in turn is controlled by the selective energization of motor windings 64 and 66; the longitudinal position of nut 74 controls the opening and closing of limit switches 56 and 58 such that when nut 74 is in the position shown in Figure 2, an actuating arm 76 connected to nut 74 opens limit switch 58, and when nut 74 is in the other extreme position, limit switch 56 is open. Nut 74 has connected thereto, a radially directed pin 78 which is received between projecting finger portions 80 of a yoke 82 which is fixedly attached to an arm 84 of a bell-crank 86.

A lever 88 is controllably connected to bell-crank 86 by a torsion spring 90 which has an upturned end 92 attached to an arm portion 94 of bell-crank 86 and an upturned end 96 suitably attached to the lever 88. This arrangement provides a resilient connection between bell-crank 86 and lever 88 so that when bell-crank 86 is rotated in a given direction, lever 88 will also rotate if the resistance to movement of lever 88 is not too great. When the resistance is too great, the connection is yieldable due to the connection of bell-crank 86 with lever 88 through spring 90, as shown in Figure 3.

The lever 88 has attached thereto a swivel barrel type connection 98 with lever 100 so that oscillations of lever 88 result in oscillations of lever 100. A shiftable member 102 is slideably splined to a clutch sleeve 104 and a low speed reaction means 106 is fixed in the axle housing and has low speed ratio brake teeth 108 formed thereon. Brake teeth 110 are formed externally on shiftable member 102 to be selectively engageable with teeth 108. A high speed ratio clutch means is comprised of a row of internal clutch teeth 112 formed on shiftable member 102 which are adapted to be selectively engageable with clutch teeth 114 formed on an axle element 116.

The aforementioned speed responsive means 22 is comprised of a worm gear 118 drivingly connected to a shaft 120. A pair of arms 122 are pivotally connected to a crossarm portion 124 fixed to shaft 120 and a sleeve member 126 is adapted to be axially movable on shaft 120 by link means 128 which are pivotally connected to sleeve 126 and intermediate portions of pivotal arms 122. A spring 130 is disposed on shaft 120 so as to react against crossarm 124 and to hold sleeve 126 in a downward position, as viewed in Figure 2. Weights 132 affixed to the free ends of pivotal arms 122 are movable outwardly in response to centrifugal force and due to the action of linkage 122, 124, and 128, sleeve 126 is moved upwardly and out of engagement with contacts 48 and 50. Figure 2 illustrates the device during this mode of operation. It is to be understood that the aforementioned novel means for preventing a shift from high speed ratio to low speed ratio before a predetermined reduced speed is reached can be utilized with axle means other than the structure shown in Figures 3 and 4, and is shown in this manner merely to exemplify one adaptation of this novel means.

In order to have a clear understanding of the operation of this device, a typical cycle is set forth as follows:

Figure 2 is an illustration of the device wherein the control switch is in a selected position for engagement of the high speed ratio of the axle and the shift has been completed, which is evident from the position of shifting means 74 which has opened limit switch 58, thus deenergizing winding 66 of motor 68. If it is desired to shift from high speed ratio (as shown) to the low speed ratio, handle 42 is moved upwardly so that dual contact 40 is in bridging relation to contacts 34 and 36. Current is fed from source 26 through conductor 30, contact 36, through dual contact 40 to contact 34, conductor 44, contact 48, sleeve 126, contact 50, conductor 52, limit switch 56, conductor 60, motor winding 64, and ground conductor 70. When the shift to low speed ratio is completed, actuating arm 76 opens limit switch 56 thus deenergizing the motor. The structure is capable of performing the cycle of operation when speed responsive means 22 is operated below a predetermined speed such that sleeve 126 is in engagement with contacts 48 and 50. If, however, an attempt to shift from high speed ratio to low speed ratio is made when the vehicle is operating above a predetermined speed, weights 132 are moved outwardly by centrifugal force and move sleeve 126 to a disengaged position with respect to contacts 48 and 50. It is obvious therefore, that when the attempted shift to low speed ratio is made above a predetermined speed, it is impossible to energize motor 68 and the motor will become energized only when the vehicle falls below the aforementioned predetermined speed. Before the vehicle decelerates below the predetermined speed, the axle will remain in high speed ratio and cannot be moved to a neutral condition.

It is obvious from the foregoing description that a novel means has been set forth which prevents a shift of a multiple speed ratio axle from a high speed ratio to neutral or a low speed ratio when the vehicle is operating above a predetermined speed and the shift can only be completed to low speed ratio when the vehicle falls below the aforementioned predetermined speed. This novel structure eliminates premature shifting to a lower speed ratio and renders it impossible to effect such a shift or a partial shift to a neutral condition until the desired lower speed is attained.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

I claim:

1. In a vehicle, a change speed transmission having a plurality of selective gear ratios, a control means for a multiple speed ratio axle means comprising an input driving means to said axle means, a control switch means to effect either a high speed ratio or a low speed ratio in said axle means and shift preventing means comprising speed responsive means responsive to the speed of said input driving means and being operable to prevent a shift out of said high speed ratio to neutral or to said low speed ratio when the vehicle is operating above a predetermined speed and said shift preventing means being operable completely independent of the selected gear ratio in the change speed transmission.

2. In a vehicle, a change speed transmission having a plurality of selective gear ratios, a multiple speed ratio axle means having a high speed ratio and a low speed ratio, input driving means to said axle means, electric motor means operable to effect a shift to either said high speed ratio or said low speed ratio, preselect switch means operable to select either said high speed ratio or said low speed ratio, and shift preventing means comprising a speed responsive governor means driven at a speed proportional to the speed of said input means operable to render said preselect switch means inoperative to effect a shift to neutral or to said low speed ratio when the vehicle is operating above a predetermined speed and said shift preventing means being operable completely independent of the selective gear ratio in the change speed transmission.

3. A device according to claim 2 comprising a circuit means interconnecting said preselect switch means, said speed responsive means and said motor means to shift said axle means from a low speed ratio to a high speed ratio, whereby said speed responsive means opens said circuit means when said vehicle is operating above a predetermined speed.

References Cited in the file of this patent

UNITED STATES PATENTS

| | | |
|---|---|---|
| 2,306,865 | Claytor | Dec. 29, 1942 |
| 2,638,793 | Winther et al. | May 19, 1953 |
| 2,648,232 | Randol | Aug. 11, 1953 |
| 2,754,692 | Russell | July 17, 1956 |
| 2,774,251 | Price | Dec. 18, 1956 |
| 2,911,848 | Carnagua | Nov. 10, 1959 |